(12) United States Patent
Fagan (10) Patent No.: US 7,482,837 B2
(45) Date of Patent: Jan. 27, 2009

(54) SYSTEM AND METHOD FOR COMBINING SIGNALS ON A DIFFERENTIAL I/O LINK

(75) Inventor: John L. Fagan, Pasadena, MD (US)

(73) Assignee: Atmel Corporation, San Jose, CA (US)

( * ) Notice: Subject to any disclaimer, the term of this patent is extended or adjusted under 35 U.S.C. 154(b) by 467 days.

(21) Appl. No.: 11/401,205

(22) Filed: Apr. 10, 2006

(65) Prior Publication Data

US 2007/0237243 A1    Oct. 11, 2007

(51) Int. Cl.
*H03K 19/0175* (2006.01)

(52) U.S. Cl. .......................................... 326/82; 326/93
(58) Field of Classification Search ............. 326/82–87, 326/93–98
See application file for complete search history.

(56) References Cited

U.S. PATENT DOCUMENTS

| | | | |
|---|---|---|---|
| 5,808,481 A | 9/1998 | Thompson | |
| 5,939,904 A | 8/1999 | Fetterman et al. | |
| 6,313,696 B1 | 11/2001 | Zhang | |
| 6,441,688 B1 | 8/2002 | Lau et al. | |
| 6,670,836 B1 | 12/2003 | Zivanovic | |
| 7,132,857 B2 * | 11/2006 | Jurek | 326/82 |
| 2003/0174023 A1* | 9/2003 | Miyasita | 330/254 |
| 2007/0139086 A1* | 6/2007 | Liu | 327/108 |
| 2007/0280342 A1* | 12/2007 | Hidaka | 375/232 |

* cited by examiner

*Primary Examiner*—Don P Le
(74) *Attorney, Agent, or Firm*—Schwegman, Lundberg & Woessner, P.A.

(57) ABSTRACT

System and method for combining signals on a differential signal provided over a communication link. In one aspect, a system for providing a differential communication link includes a signal combination circuit that receives a data signal and a clock signal and outputs a modulated differential signal on a differential link, where the modulated differential signal includes a differential data signal having an offset modulated at a frequency of the clock signal. A receiving circuit receives the modulated differential signal and senses and recovers the data signal and the clock signal therefrom.

23 Claims, 4 Drawing Sheets

SYSTEM AND METHOD FOR COMBINING SIGNALS ON A DIFFERENTIAL I/O LINK

FIELD OF THE INVENTION

The present invention relates to signal communication in electronic circuits, and more particularly to communicating information via differential signals over a communication link.

BACKGROUND OF THE INVENTION

A variety of different signalling techniques are used to transmit electronic signals over transmission media between electronic components. One technique that is used is called Low Voltage Differential Signalling (LVDS), which allows signals to be transmitted at very high frequencies over inexpensive, twisted-pair copper cables. In computer devices, LVDS is used for signalling over computer networks and internally in machines over computer buses.

LVDS is a differential signalling system, so that it uses the difference in voltages between two wires to signal information. The cost of two conductors or wires to convey the signal is offset by the gain in noise tolerance in the form of common-mode rejection, i.e., the same noise will be on both wires and so will cancel, leaving the difference. Since signal to noise rejection has been improved, the signal swing can be dropped to only a few hundred millivolts. The small swing enables faster data rates since the rise time is now shorter.

In an LVDS system, two different voltages are transmitted and are compared at the receiver. For example, the transmitter can inject a small current, such as 3.5 milliamperes, into one wire or the other, depending on the logic level to be sent. The current passes through a termination resistor at the receiving end, then returns in the opposite direction along the other wire. The receiver senses the polarity of the voltage difference across the resistor and uses this differential voltage to determine the logic level. Since only a small amplitude is used for the signal, the effects of capacitance and inductance are much reduced, as is the amount of radiated electromagnetic noise. The low differential voltage, typically on the order of 350 mV, causes LVDS to consume very little power compared to other systems, and this can be maintained at high frequencies due to the low voltage swing.

One problem with prior LVDS systems is that there is not an efficient way to provide a distinct clock signal as well as a data signal on a single transmitted signal. For example, a typical technique uses a serializer-deserializer (serdes) in a coding scheme such as 8B/10B encoding. In such encoding, two additional bits are added to provide and maintain sufficient state changes in the signal for the receiver to extract a clock signal embedded on the data signal using, for example, a phase-locked loop. However, this means that an extra two bits are transmitted for every byte, creating a reduced data rate and inefficiencies in the transmission. Furthermore, additional electronic components are needed to extract the clock signal.

Accordingly, what is needed is a method and system for providing an LVDS transmission system that can embed a second signal, such as a clock signal, on a data signal with greater data rate than in prior systems, and in which the solution is simple and inexpensive to implement. The present invention addresses such a need.

SUMMARY OF THE INVENTION

The invention of the present application relates to combining signals on a differential signal provided over a communication link. In one aspect of the invention, a system for providing a differential communication link includes a signal combination circuit that receives a data signal and a clock signal and outputs a modulated differential signal on a differential link, where the modulated differential signal includes a differential data signal having an offset modulated at a frequency of the clock signal. A receiving circuit coupled to the differential link receives the modulated differential signal and senses and recovers the data signal and the clock signal from the modulated differential signal.

In another aspect of the invention, a method for providing a differential signal over a communication link includes receiving a data signal and a clock signal, and creating a differential data signal and modulating the offset of the differential data signal at a frequency of the clock signal, creating a modulated differential signal. The modulated differential signal is output over a differential link, and the data signal and the clock signal are sensed and recovered from the modulated differential signal.

In another aspect of the invention, a signal combination circuit for providing a modulated differential signal for transmission over a communication link. An output buffer receives a data signal and outputs a differential data signal, and an offset modulator is coupled to the output buffer that receives a clock signal and modulates the offset of the differential data signal with the clock signal, such that a modulated differential signal is output over the communication link which combines the data signal and the clock signal. The data signal and clock signal are each recoverable from the modulated differential signal by a receiver connected to the communication link.

The present invention provides a differential signalling method and system that allows two signals, such as a clock signal and a data signal, to be combined and transmitted at the same time on the differential signal. The present invention does not require expensive components and does not require extra information to combine the signals, and thus is highly efficient.

DETAILED DESCRIPTION

The present invention relates to signal communication in electronic circuits, and more particularly to communicating information via differential signals over a communication link. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. The present invention will also be described in the context of particular methods having certain steps. However, the method and system operate effectively for other methods having different and/or additional steps not inconsistent with the present invention.

To more particularly describe the features of the present invention, please refer to FIGS. 1 through 5b in conjunction with the discussion below.

Figure 1:
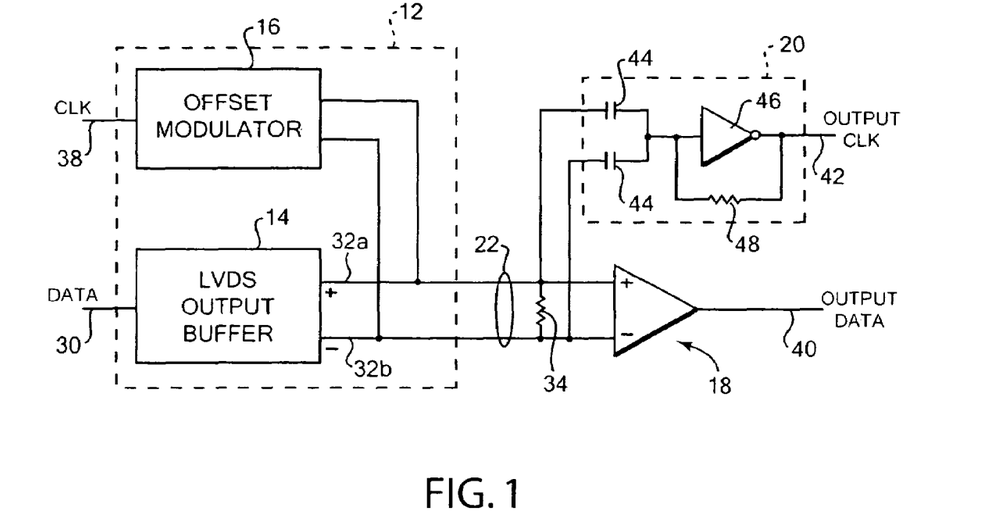
FIG. 1 is a block diagram illustrating a differential signalling system in accordance with the present invention.

FIG. 1 is a block diagram of a differential signalling system 10 in accordance with the present invention. System 10 includes a signal combination block 12 which includes a Low Voltage Differential Signalling (LVDS) buffer 14 and an offset modulator 16. System 10 further includes a data amplifier 18 and a clock amplifier 20 at the other end of a transmission channel 22.

A data signal 30 is provided to the LVDS buffer 14 of the signal combination block 12. The data signal 30 is a digital signal provided from any suitable source, such as an internal source of data on a integrated circuit or other electronic component. The data signal 30 is desired to be sent across the transmission channel 22 to a destination component in an electronic system.

The data signal 30 is processed by the LVDS buffer 14 to become a differential voltage signal output from the buffer 14. One embodiment of an LVDS buffer 14 is described below with reference to FIG. 2, and is suitable for operation with an offset modulator 16 embodiment described with reference to FIG. 3. A different embodiment of the signal combination block 12, including LVDS buffer 14 and offset modulator 16, is described below with reference to FIG. 4.

The LVDS buffer 14 produces currents and complementary voltages on differential lines 32a and 32b in accordance with the input data signal 30, the lines 32a and 32b being output from the buffer 14 (and each being a 50 ohm transmission line). Differential lines 32a and 32b form transmission channel 22 which transmits the output voltage to the destination components at the receiving end. For example, the channel 22 can be a cable or other transmission line. A termination resistor 34 is coupled to the channel 22 at the receiving end, to match the impedance of the transmission line and reduce harmful signal reflections. A voltage drop is provided across the termination resistor 34 to provide a differential voltage across the resistor. For example, the termination resistor 34 is typically 100 ohms, but can be any resistance suited to termination for the circuit components and standard used.

The transmission line can be any interface or channel suitable for the high-speed signal transmission allowed by the present invention. For example, communication interfaces such as Universal Serial Bus (USB), Firewire, Fibre Channel, etc., can be used between electronic components (computer or electronic devices, components on a computer or electronic device, etc.), and are suitable for the present invention.

An offset modulator 16 of the signal combination block 12 is used in the present invention to combine a second signal on the output signals of the LVDS buffer 14. In the described embodiment, the second signal is a clock signal 38 received from a suitable component, e.g., a clock crystal or other clock generator. In the described embodiment, the clock signal 38 is preferably a full swing sinusoidal signal, such that the voltage is continuously changing from one rail to the other. Other clock signals can be used in other embodiments.

The clock signal 38 is input to the offset modulator 16, and the modulator 16 is coupled to the output differential lines 32a and 32b of the LVDS buffer 14. The offset modulator 16 modulates an offset amplitude of the LVDS output signals with the amplitude of the clock signal 38, thus combining the lower frequency clock onto the higher frequency data signal to create a single modulated signal. One embodiment of the offset modulator 16 of the present invention is described below with reference to FIG. 2, which is suitable for use with the LVDS buffer of the present invention as described in FIG. 3. A different embodiment of the signal combination block 12, including LVDS buffer 14 and offset modulator 16, is described below with reference to FIG. 4.

At the receiving end of the channel 22, a data amplifier 18 is coupled the terminals of the termination resistor 34 to sense the differential voltage across that resistor. Data amplifier 18 is a differential amplifier that can detect a very small input differential across the terminals of the termination resistor 34. The amplifier 18 amplifies the amplitude of the differential signal over a wide range of offset voltages and outputs the signal as the received data signal on line 40. This signal retains all the information that was input to the transmitting side of the system on data signal 30.

A clock amplifier 20 is also connected at the receiving end of the transmission channel 22. Clock amplifier 20 is coupled across the terminals of the termination resistor 34 similarly to the data amplifier 18. The clock amplifier 20 can sense very small changes in the differential signal and amplify the clock signal that was modulated with the data signal by the offset modulator 16, producing an output clock signal on line 42 for the receiving component(s) of the system.

In the described embodiment, clock amplifier 20 includes two capacitors 44, each capacitor coupled to one side of the termination resistor 34. The capacitors 44 are coupled together at their other terminals and coupled to an inverter 46. The output of the inverter 46 provides the output clock on line 42. Also, a feedback resistor 48 is coupled from the output to the input of the inverter 46.

Figure 5A:
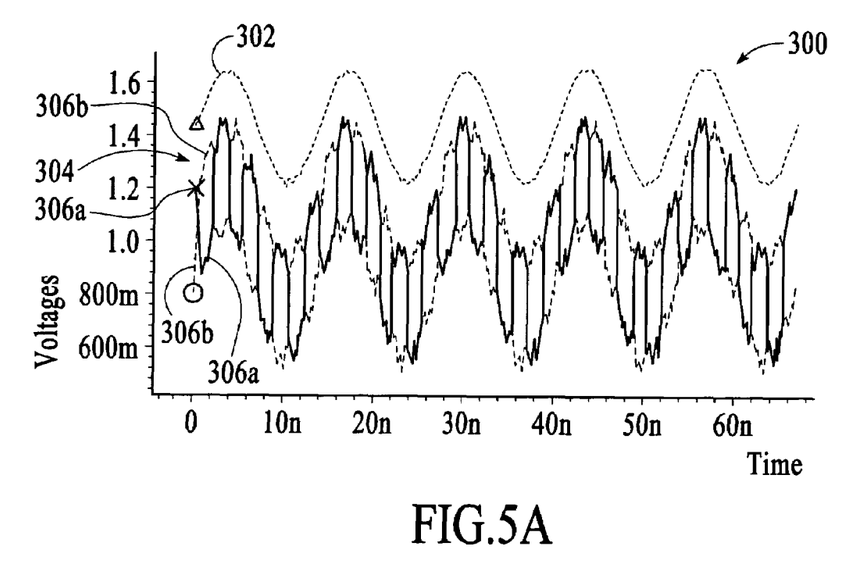
FIGS. 5a and 5b are graphs illustrating selected signals used in the differential signalling system of the present invention.

In operation, the capacitors 44 couple both the positive and negative AC portions of the differential signal onto a single node, which is input to the inverter 46. The capacitors transmit the portions of the differential signal that are moving together, and the portions of the signal that are moving in opposite directions are cancelled. This causes the data portion of the modulated differential signal to cancel out, since those portions are differentially moving in opposite directions (see FIG. 5), while the modulating clock signal is allowed to pass through to the inverter 46. The inverter 46 has an input switching threshold set by the feedback resistor 48. When the input voltage goes above the inverter's input threshold, the inverter switches its output to low, and when the input voltage goes below the threshold, the inverter switches its output back to high, thereby creating a clock signal. The inverter 46 holds at its switching threshold as long as a signal with regular changes is provided, such as the clock signal. Any small change on the input (around the threshold) is sensed and provided as a large change on the output of the inverter based on the resistive feedback, creating the clock signal 42 for use with receiving components of the receiving system.

The present invention allows a second signal, such as clock signal 38, to be embedded on a first signal, such as data signal 30, without requiring inefficiencies or extra data to be transmitted as in prior art schemes such as 8B/10B encoding. The advantages of a high frequency LVDS system are retained, and few extra components are required. The present invention may sacrifice some noise immunity in comparison with other LVDS systems, but in many applications the advantages of the embedded clock signal outweigh such a disadvantage.

Figure 2:
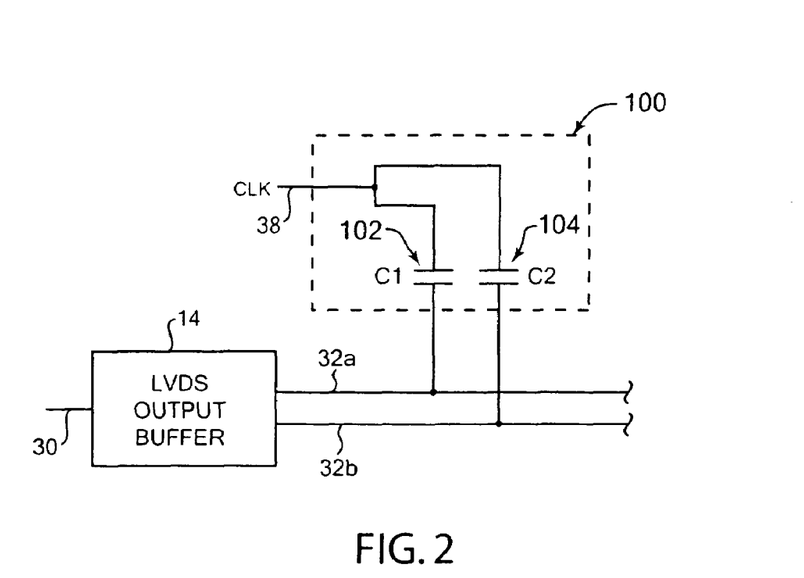
FIG. 2 is a schematic diagram of one embodiment of the offset modulator of the differential signalling system of FIG. 1.

FIG. 2 is a schematic diagram of one embodiment 100 of the offset modulator 16 of the differential signalling system 10 of the present invention. In this embodiment, the offset modulator uses capacitive coupling to modulate the data signal 30 with the clock signal 38.

Offset modulator 100 includes two capacitors 102 and 104 (C1 and C2), which each have a terminal connected to the clock signal 38. The other terminal of capacitor 102 is connected to a first differential line 32a output from the LVDS buffer 14, and the other terminal of capacitor 104 is connected to the other, second differential line 32b output from the LVDS buffer 14.

This configuration allows capacitive coupling between the clock signal 38 and the differential output signal of the LVDS buffer 14, when the clock signal is transitioning to or from the high level. The energy from the clock signal 38 transfers to the differential lines 32a and 32b carrying the data signal, which causes the differential signal to vary in offset amplitude in accordance with the clock signal, effectively modulating the differential signal with the clock signal frequency. This causes the amplitude offset of the differential signal to move based on the clock signal frequency. The two LVDS output lines 32a and 32b are close in voltage to each other and complementary, creating an offset in each signal that mirrors the other.

A capacitance value is selected for the capacitors 102 and 104 which will result in a low impedance at the frequency of the clock signal 38, allowing the capacitive coupling to occur. When the clock signal 38 changes from high to low or low to high, a percentage of the transition is coupled onto the LVDS differential signal to create the modulation. This depends also on the parasitic capacitance and inductance in the lines 32a and 32b, e.g., based on the length of the lines 32a and 32b.

For example, in one embodiment, the differential signal on lines 32a and 32b is at about 1 V, plus or minus 150 mV. A clock signal with a 3 V swing may have 10% of its signal pass to the differential signal, causing a 0.3 V offset modulation.

Figure 3:
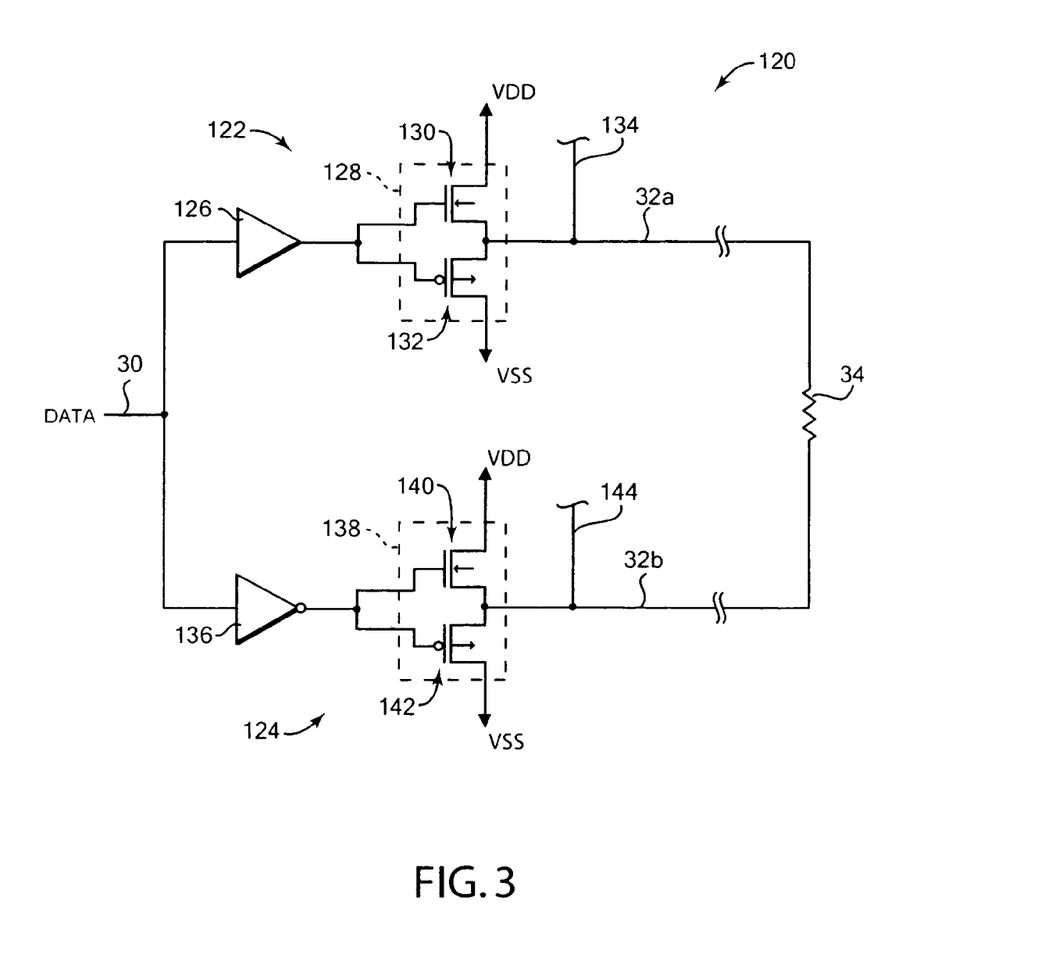
FIG. 3 is a schematic diagram illustrating one embodiment of an LVDS buffer for use with the capacitively-coupled offset modulator of FIG. 2.

FIG. 3 is a schematic diagram of one embodiment 120 of an LVDS buffer 14 which is intended for use with the capacitively-coupled offset modulator 100 shown in FIG. 2.

LVDS buffer 120 includes a first circuit 122 that outputs the signal for differential line 32a, and a second circuit 124 that outputs the signal for differential line 32b, where the data signal 30 is input to both circuits 122 and 124.

First circuit 122 includes a buffer 126, which receives the data signal 30 and reduces the input load. The buffer 126 provides its output to an upside-down inverter 128, which includes an NMOS transistor 130 and a PMOS transistor 132. The gates of transistors 130 and 132 are coupled to the output of the buffer 126, a terminal of the NMOS transistor 130 is connected to VDD voltage source, a terminal of the PMOS transistor 132 is connected to the VSS voltage, and the other terminals of transistors 130 and 132 are connected together to provide the output pad, where the differential line 32a is connected to the output pad. The capacitor 102 of the offset modulator 16 of FIG. 2 can connect to the differential line 32a via connection 134 as shown.

Second circuit 124 includes an inverter 136, which receives the data signal 30 and reduces the input load (and inverts the signal to maintain the differential output of lines 32a and 32b). The inverter 136 provides its output to an upside-down inverter 138, which includes an NMOS transistor 140 and a PMOS transistor 142. The gates of transistors 140 and 142 are coupled to the output of the inverter 136, a terminal of the NMOS transistor 140 is connected to VDD voltage source, a terminal of the PMOS transistor 142 is connected to the VSS voltage, and the other terminals of transistors 140 and 142 are connected together to provide the output pad, where the differential line 32b is connected to the output pad. The capacitor 104 of the offset modulator 16 of FIG. 2 can connect to the differential line 32b via connection 144 as shown. The differential lines 32a and 32b are coupled to termination resistor 34 as described with reference to FIG. 1.

An NMOS transistor, like transistors 130 and 140, does not pass a high signal very well. Here, when the NMOS transistor 130 turns on to connect the output pad high to VDD, the high level (VDD) is reduced by the NMOS threshold voltage and its body effect. For example, for 0.35 CMOS and 3.3 volt operation, the output high voltage at the output pad is about 2.1 volts. NMOS transistor 140 has similar operation.

Likewise, a PMOS transistor, like transistors 132 and 142, does not pass a low signal (zero) very well. Here, when the PMOS transistor 130 turns on to connect the output pad low to ground (VSS), the low level (VSS) is reduced by the PMOS threshold voltage and its body effect. For example, for 0.35 CMOS and 3.3 volt operation, the output low voltage at the output pad is about 1.3 volts. PMOS transistor 142 has similar operation.

For the described embodiment of the present invention, the PMOS transistors 132 and 142 do not pull all the way to zero for a low signal, and thus do not offer any resistance to another source pulling the pad low, such as the clock signal from capacitors 102 and 104. Similarly, the NMOS transistors 130 and 140 do not pull all the way to VDD for a high signal. Thus, the capacitively coupled clock signal from capacitors 102 and 104 can pull the low signal lower, and can pull the high signal higher, to modulate the clock information onto the differential waveform output on differential lines 32a and 32b.

Figure 4:
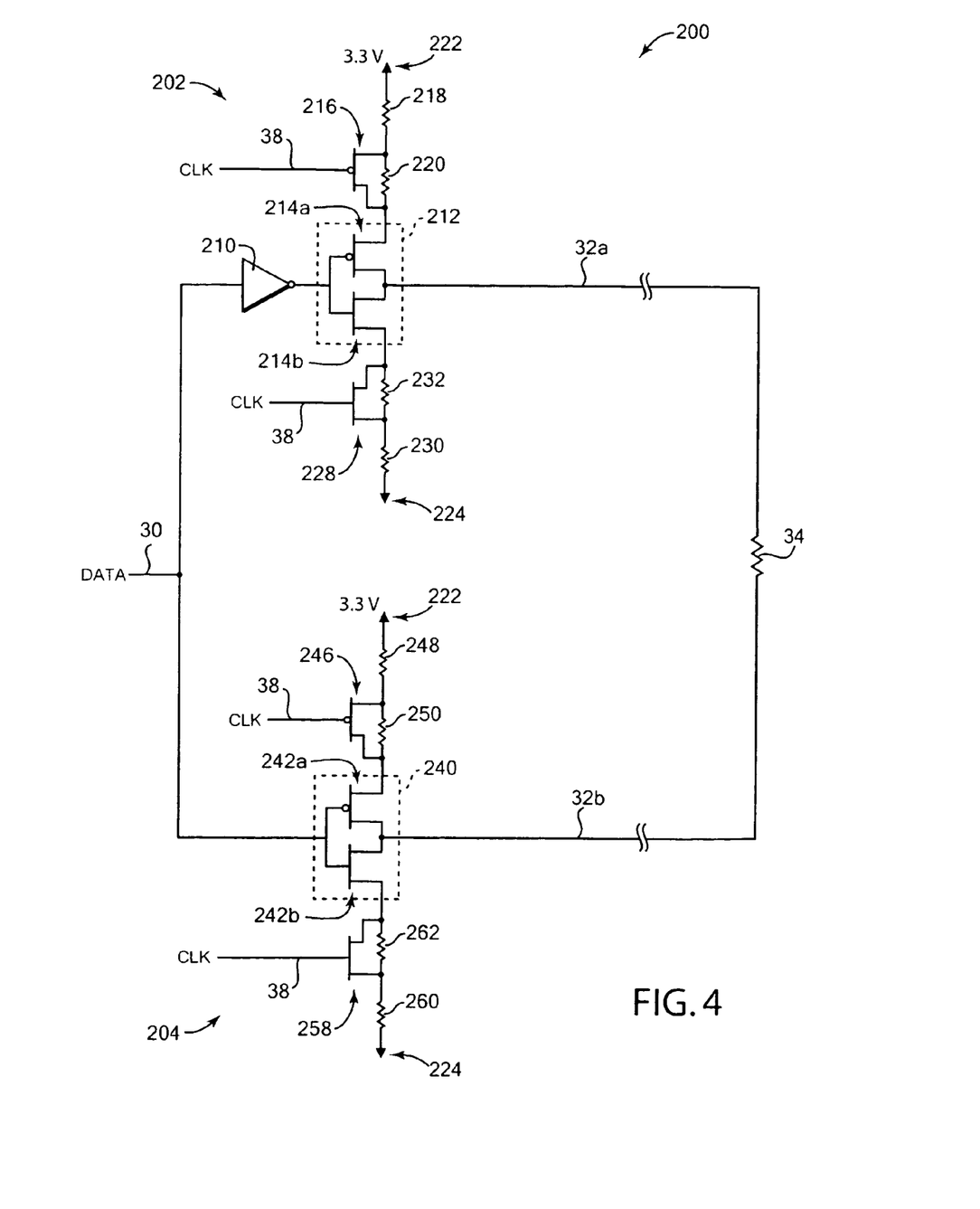
FIG. 4 is a schematic diagram illustrating a different embodiment of the signal combination block of FIG. 1.

FIG. 4 is a schematic diagram of a different embodiment 200 of the signal combination block 12, including the LVDS buffer 14 and the offset modulator 16. In this embodiment, the offset of the differential signal is modulated using resistance. The buffer 14 and modulator 16 are combined within the same circuit 200.

Signal combination block 200 receives the data signal 30 and provides that signal to two different circuits, a first circuit 202 which outputs the signal for line 32a, and a second circuit 204 which outputs the signal for line 32b.

First circuit 202 includes an inverter 210, which inverts the data signal 30. The output of inverter 210 is coupled to another inverter 212. Inverter 212 is a CMOS inverter in the embodiment shown, having two transistors 214a and 214b, 214a being a p-channel (e.g., PMOS) transistor and 214b being an n-channel (e.g., NMOS) transistor. The signal from inverter 210 is input to the gates of both transistors 214a and 214b, the drains of the transistors 214a and 214b are coupled together, the source of the p-channel transistor 214a is connected to a voltage source 222 (via other components detailed below), and the source of the n-channel transistor 214b is connected to ground 224 via other components detailed below. The data output pad is connected to the two drains of the transistors 214a and 214b. Because of the two inverters 210 and 212, the data output by the circuit 202 on line 32a is at the same logic level as the data 30 input to the circuit 202.

The input clock signal 38 is also provided at several inputs of the signal combination block 200. Clock signal 38 is input to a p-channel (e.g., PMOS) transistor 216, where the drain of transistor 216 is connected to the source of transistor 214a, the source of transistor 216 is connected to one terminal of a resistor 218, and a resistor 220 is connected between the source and drain of the transistor 216. The other terminal of resistor 218 is connected to the voltage source 222. Similarly, the clock signal 38 is also input to a gate of an n-channel transistor 228, where the drain of transistor 228 is connected to the source of transistor 214b, the source of transistor 228 is connected to one terminal of a resistor 230, and a resistor 232 is connected between the source and drain of the transistor 228. The other terminal of resistor 230 is connected to ground 224.

Negative circuit 204 is similar to the positive circuit 202, except that no inverter is placed on the data input line 30, i.e. there is no inverter equivalent to inverter 210. Thus, the data line 30 is coupled to an inverter 240, which can be a standard CMOS inverter as shown, having two transistors 242a and 242b, 242a being a p-channel (e.g., PMOS) transistor and 242b being an n-channel (e.g., NMOS) transistor. The data signal 30 is input to the gates of both transistors 242a and 242b, the drains of the transistors 242a and 242b are coupled together, the source of the transistor 242a is connected to voltage source 222 (via other components detailed below), and the source of the transistor 242b is connected to ground 224 via other components detailed below. The negative data output is connected to the two drains of the transistors 242a and 242b. The data output by the circuit 204 on line 32b thus is the opposite logic level to the data 30 input to the circuit 204.

The input clock signal 38 is input to a p-channel transistor 246, where the drain of transistor 246 is connected to the source of transistor 242a, the source of transistor 246 is connected to one terminal of a resistor 248, and a resistor 250 is connected between the source and drain of the transistor 246. The other terminal of resistor 248 is connected to the voltage source 222. Similarly, the clock signal 38 is also input to a gate of an n-channel transistor 258, where the drain of transistor 258 is connected to the source of transistor 242b, the source of transistor 258 is connected to one terminal of a resistor 260, and a resistor 262 is connected between the source and drain of the transistor 258. The other terminal of resistor 260 is connected to ground 224.

Circuit 200 operates as follows. The data signal 30 is input to the circuit and is routed to the first circuit 202 and the second circuit 204. In the first circuit 202, the data signal is inverted twice by inverters 210 and 212 and is output on differential line 32a as the positive signal of the differential output of the circuit.

The data signal on line 32a is modified in accordance with the clock signal 38. The clock signal 38 is input to p-channel transistor 216, which turns that transistor on and off in accordance with the clock's low and high levels, respectively. When it is turned on, the resistor 220 is shorted out, so that less resistance is seen at the positive end, i.e., from the inverter 212 to the voltage source 222. Similarly, the clock signal is input to n-channel transistor 228, which turns that transistor on and off in accordance with the clock's high and low levels, respectively. When it is turned on, the resistor 232 is shorted out, so that less resistance is seen from the inverter 212 to ground 224. This is the opposite effect of p-channel transistor 216, so that only one of the resistors 220 and 232 is shorted out for a given clock level. Thus, the clock signal 38 switches in more resistance into the pull up resistance of the positive branch and the pull down resistance of the negative branch at alternate clock levels. This has the effect of moving the offset of the output signal on line 32a up or down according to the clock signal level, i.e., the signal on line 32a is moved up when the clock signal 38 is low, and the signal on line 32a is moved down when the clock signal 38 is high.

In one example, resistors 218 and 230 can be 400 ohms, and resistors 220 and 232 can be 100 ohms. If the voltage source 222 is 3.3 volts, then the center of the offset is at about 1.1 volts, and the swing is about±0.15 volt.

The data signal on line 32b is modified by the clock signal 38 similarly to the data signal on line 32a. Thus, the clock signal 38 is input to n-channel transistor 246, which turns that transistor on and off in accordance with the clock's low and high levels, respectively. When it is turned on, the resistor 250 is shorted out, so that less resistance is seen at the positive end, i.e., from the inverter 212 to voltage source 222. Similarly, the clock signal is input to n-channel transistor 258, which turns that transistor on and off in accordance with the clock's high and low levels, respectively. When it is turned on, the resistor 262 is shorted out, so that less resistance is seen from the inverter 212 to ground 224. Only one of the resistors 250 and 262 is shorted out for a given clock level. Thus, the clock signal 38 switches in more resistance into the pull up resistance of the positive branch and the pull down resistance of the negative branch at alternate clock levels, moving the offset of the output signal on line 32b up or down according to the clock signal level.

In the example described above, resistors 248 and 260 can be 400 ohms, and resistors 250 and 262 can be 100 ohms. Thus the clock signal 38 would switch 100 ohms alternately into the negative and positive paths of the circuit, where one path would have 500 ohms while the other had 400 ohms. If the voltage source 222 is 3.3 volts, then the center of the offset is at about 1.1 volts, and the swing is about 0.15 volt from the center in either direction.

The differential data signals on lines 32a and 32b are coupled to the terminals of the terminal resistor 34 as described above with reference to FIG. 1.

The above embodiment effectively modulates the output signal with the clock signal. The offset swing of 0.3 volts is small, allowing a limited voltage swing and limited current as used for high speed transmission of signals in LVDS operation. The present invention is also suitable for other differential signalling systems besides LVDS, which can use a similar scheme for providing data signals and other types of signals.

FIG. 5a is a graph 300 illustrating some of the signals used in the differential signalling system 10 of the present invention. This is one example of output using the resistive modulation embodiment of FIG. 4, described above. Graph 300 presents time vs. voltage axes.

Clock sine wave signal 302 is a signal derived from the input clock signal 38 input to the system 10. For example, if a digital square wave clock signal (see FIG. 5b) is input as clock signal 38, then clock sine wave signal 302 is the output after the capacitors 44 of the clock amplifier 20 of FIG. 1. The frequency of clock sine wave signal 302 is the same as the clock signal 38.

Modulated differential signal 304 is output from the signal combination block 12 on lines 32a and 32b and combines the data and clock signals. Differential signal 304 includes signal 306a from the positive output of the signal combination block, and signal 306b from the negative output of the signal combination block, where signal 306b is the opposite polarity from signal 306a. Thus, the signals cross periodically at the frequency of the data signal 30 input to the system. Differential signal 304 is also modulated in its amplitude offset (envelope-modulated) by the clock sine wave signal 302. Thus, the signals 306a and 306b have an offset of about 1.1 volts, as shown, that offset varying up to about 1.3 volts and down to 0.7 volts according to the clock signal 302. It should be noted that the signals 306a and 306b are shown assuming a data signal that simply alternates its logic levels, for illustrative purposes.

Figure 5B:
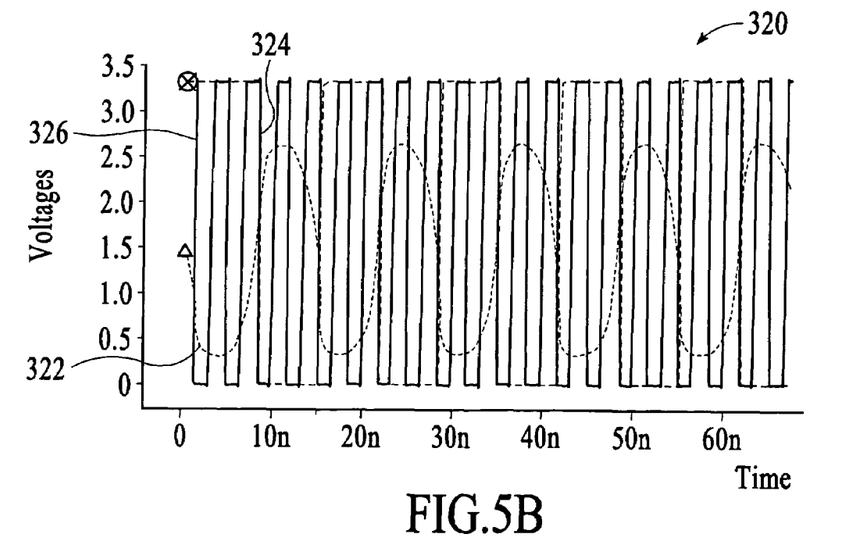

FIG. 5b is a graph 320 illustrating examples of additional signals used in the differential signalling system 10 of the present invention. This is one example of signals when using the resistive modulation embodiment of FIG. 4, described above. Graph 320 presents time vs. voltage axes.

Input clock signal 324 is an example of the digital clock signal provided on line 38 as shown in FIG. 1. Output clock signal 322 is output on line 42 of system 10 as the recovered clock signal, and is an amplified and inverted version of the clock sine wave signal 302 shown in FIG. 5a. Signal 322 is recovered from the modulated differential signals 306a and 306b on lines 32a and 32b by clock amplifier 20 as described above. Output data signal 326 is also recovered from the modulated differential signals by data amplifier 18, and is output on line 40 from the system 10.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for providing a differential communication link, the system comprising:
    a signal combination circuit that receives a data signal and a clock signal and outputs a modulated differential signal on a differential link, the modulated differential signal including a differential data signal having an offset modulated at a frequency of the clock signal; and
    a receiving circuit coupled to the differential link and receiving the modulated differential signal, the receiving circuit sensing and recovering the data signal and the clock signal from the modulated differential signal.

2. The system of claim 1 wherein the differential data signal carries the data signal and has a first frequency, and the frequency of the clock is a second frequency that is lower than the first frequency.

3. The system of claim 1 wherein the signal combination circuit includes an output buffer for providing the differential data signal and an offset modulator for modulating the clock signal on the differential data signal.

4. The system of claim 3 wherein the offset modulator includes two capacitors, each capacitor coupled to the clock signal and coupled to one of two differential data lines, wherein the clock signal pulls the data signal higher and lower according the level of the clock signal.

5. The system of claim 4 wherein the output buffer includes an upside down inverter for each of the two differential data lines, wherein each upside down inverter includes two transistors which pull the data signal partially high and partially low.

6. The system of claim 3 wherein the signal combination circuit includes a plurality of transistors and a plurality of resistors, wherein the resistors are coupled in and out of the circuit by the clock signal to provide resistive modulation of the offset of the differential data signal.

7. The system of claim 1 wherein the receiving circuit includes a data amplifier for providing the recovered data signal and a clock amplifier for providing the recovered clock signal.

8. The system of claim 7 wherein the clock amplifier includes two capacitors, each capacitor coupled to one of two differential lines of the modulated differential signal.

9. The system of claim 8 wherein the clock amplifier includes an inverter coupled between the terminals of a resistor, wherein the input of the inverter is coupled to the capacitors of the clock amplifier and the output of the inverter provides an amplified recovered clock signal.

10. The system of claim 1 wherein the output buffer is a Low Voltage Differential Signalling (LVDS) buffer.

11. A method for providing a differential signal over a communication link, the method comprising:
    receiving a data signal and a clock signal;
    creating a differential data signal and modulating the offset of the differential data signal at a frequency of the clock signal, creating a modulated differential signal;
    outputting the modulated differential signal over a differential link; and
    receiving the modulated differential signal from the differential link, including sensing and recovering the data signal and the clock signal from the modulated differential signal.

12. The method of claim 11 wherein the differential data signal has a first frequency, and the frequency of the clock is a second frequency that is lower than the first frequency.

13. The method of claim 11 wherein the modulating the offset of the differential data signal includes using two capacitors, each capacitor coupled to the clock signal and coupled to one of two differential data output lines, wherein the clock signal pulls the data signal higher and lower according the level of the clock signal.

14. The method of claim 13 wherein the creating of the differential data signal includes providing an upside down inverter for each of the two differential data lines, wherein each upside down inverter includes two transistors which pull the data signal partially high and partially low.

15. The method of claim 11 wherein the modulating the offset of the differential data signal includes using a plurality of transistors and a plurality of resistors, wherein the resistors are coupled in and out of the circuit by the clock signal to provide resistive modulation of the offset of the differential data signal.

16. The method of claim 11 wherein the receiving circuit includes a data amplifier for providing the recovered data signal and a clock amplifier for providing the recovered clock signal.

17. The method of claim 16 wherein recovering the clock signal includes using two capacitors, each capacitor coupled to one of two differential lines of the modulated differential signal, and using an inverter coupled between the terminals of a resistor to receive a signal from the capacitors and the output an amplified recovered clock signal.

18. A signal combination circuit for providing a modulated differential signal for transmission over a communication link, the signal combination circuit comprising:
    an output buffer that receives a data signal and outputs a differential data signal; and
    an offset modulator coupled to the output buffer that receives a clock signal and modulates the offset of the differential data signal with the clock signal, such that a modulated differential signal is output over said communication link which combines the data signal and the clock signal,
    wherein the data signal and clock signal are each recoverable from the modulated differential signal by a receiver connected to the communication link.

19. The signal combination circuit of claim 18 wherein the differential data signal carries the data signal and has a first frequency, and the frequency of the clock is a second frequency that is lower than the first frequency.

20. The signal combination circuit of claim 18 wherein the offset modulator includes two capacitors, each capacitor coupled to the clock signal and coupled to one of two differential data lines, wherein the clock signal pulls the data signal higher and lower according the level of the clock signal.

21. The signal combination circuit of claim 20 wherein the output buffer includes an upside down inverter for each of the two differential data lines, wherein each upside down inverter includes two transistors which pull the data signal partially high and partially low.

22. The signal combination circuit of claim 18 wherein the offset modulator includes a plurality of transistors and a plurality of resistors, wherein the resistors are coupled in and out of the output buffer by the clock signal to provide resistive modulation of the offset of the differential data signal.

23. The signal combination circuit of claim 18 wherein the output buffer is a Low Voltage Differential Signalling (LVDS) buffer.

\* \* \* \* \*